(12) United States Patent
Stubbs

(10) Patent No.: US 11,685,225 B2
(45) Date of Patent: Jun. 27, 2023

(54) POWER TAKEOFF-DRIVEN REFRIGERATION

(71) Applicant: Commercial Energy Solutions, LLC, Colorado City, AZ (US)

(72) Inventor: Rustee Stubbs, Williston, ND (US)

(73) Assignee: Lovis, LLC, Wilmington, DE (US)

( * ) Notice: Subject to any disclaimer, the term of this patent is extended or adjusted under 35 U.S.C. 154(b) by 70 days.

(21) Appl. No.: 17/129,421

(22) Filed: Dec. 21, 2020

(65) Prior Publication Data

US 2021/0188036 A1 Jun. 24, 2021

Related U.S. Application Data

(63) Continuation-in-part of application No. 17/086,692, filed on Nov. 2, 2020, now Pat. No. 10,995,760.
(Continued)

(51) Int. Cl.
*B60H 1/00* (2006.01)
*B60H 1/32* (2006.01)
*B60R 16/03* (2006.01)

(52) U.S. Cl.
CPC ....... *B60H 1/0045* (2013.01); *B60H 1/00364* (2013.01); *B60H 1/00428* (2013.01);
(Continued)

(58) Field of Classification Search
None
See application file for complete search history.

(56) References Cited

U.S. PATENT DOCUMENTS

| 6,223,546 B1* | 5/2001 | Chopko | B60P 3/20 |
| | | | 62/297 |
| 6,624,533 B1* | 9/2003 | Swanson | H02P 9/307 |
| | | | 307/64 |

(Continued)

FOREIGN PATENT DOCUMENTS

| CN | 105813874 B * 12/2019 | B60K 25/02 |
| EP | 0056344 A1 * 7/1982 | |

(Continued)

OTHER PUBLICATIONS

Machine Translation of WIPO Publication WO 0250938 A1, Jun. 27, 2002. (Year: 2002).*

(Continued)

*Primary Examiner* — Steven G Snyder
(74) *Attorney, Agent, or Firm* — Gurr Brande & Spendlove, PLLC; Robert A. Gurr

(57) ABSTRACT

A system for PTO-driven refrigeration includes a generator that is configured to be mechanically connected to a power takeoff (PTO) and a converter that is configured to receive AC power from the generator and is operable to convert the AC power to DC power. The generator is connected to a charge controller that is connected to an energy storage element. The energy storage element is connected to a controller configured to receive DC power and provide AC power to a motor. The motor may be mechanically connectable to a refrigeration system. The energy storage element is further configured to receive power from a second charge controller that receives power via an AC power input or solar system.

8 Claims, 10 Drawing Sheets

Related U.S. Application Data

(60) Provisional application No. 62/951,505, filed on Dec. 20, 2019.

(52) U.S. Cl.
CPC ....... *B60H 1/00985* (2013.01); *B60H 1/3232* (2013.01); *B60R 16/03* (2013.01)

(56) References Cited

U.S. PATENT DOCUMENTS

| | | | | |
|---|---|---|---|---|
| 6,742,343 B2* | 6/2004 | Matonog | ............... | B60H 1/3232 62/298 |
| 7,231,959 B2* | 6/2007 | Larson | ................ | F02B 29/0431 165/41 |
| 7,290,592 B2* | 11/2007 | Larson | ................ | F02B 29/0431 165/41 |
| 7,458,417 B2* | 12/2008 | Larson | ...................... | F01P 3/20 123/41.01 |
| 7,584,722 B2* | 9/2009 | Sobotzik | ................. | F01P 7/048 123/41.11 |
| 7,863,764 B2* | 1/2011 | Combs | .................... | B60L 15/20 310/179 |
| 7,921,659 B2* | 4/2011 | Quesada Saborio | ... | F25D 19/00 62/298 |
| 8,096,107 B2* | 1/2012 | Larson | ....................... | F01P 7/08 60/275 |
| 8,408,341 B2* | 4/2013 | Dalum | .................... | B60K 6/442 180/65.285 |
| 8,776,928 B2* | 7/2014 | Stover, Jr. | .......... | B60H 1/00428 180/165 |
| 8,905,166 B2* | 12/2014 | Dalum | .................... | B60W 10/08 180/65.285 |
| 8,978,798 B2* | 3/2015 | Dalum | .................... | B60L 50/90 180/65.22 |
| 9,061,680 B2* | 6/2015 | Dalum | .................... | B60K 25/02 |
| 9,126,544 B2* | 9/2015 | Larson | ................. | B60R 16/03 |
| 9,389,007 B1* | 7/2016 | McKay | ................ | F25B 47/025 |
| 9,586,458 B2* | 3/2017 | Larson | ................ | B60H 1/00428 |
| 9,641,047 B2* | 5/2017 | Collett | .................. | H02K 7/1807 |
| 9,643,593 B2* | 5/2017 | Dalum | ............. | B60W 30/1888 |
| 9,751,518 B2* | 9/2017 | Dalum | .................... | B60W 20/20 |
| 9,878,616 B2* | 1/2018 | Dalum | .................... | B60K 25/00 |
| 10,214,199 B2* | 2/2019 | Dalum | .................... | B60W 20/00 |
| 10,240,847 B1* | 3/2019 | Thomas, Jr. | ......... | F25D 11/003 |
| 10,428,844 B1* | 10/2019 | Holt | .......................... | B60P 3/20 |
| 10,792,993 B2* | 10/2020 | Dalum | .................... | B60W 10/08 |
| 10,940,832 B1* | 3/2021 | Hardenia | ................ | B60R 25/32 |
| 2003/0205360 A1* | 11/2003 | Larson | ................ | F02B 29/0431 165/42 |
| 2006/0137923 A1* | 6/2006 | Larson | .................. | F01P 3/20 180/65.28 |
| 2006/0137924 A1* | 6/2006 | Larson | ................ | F02B 29/0431 180/65.285 |
| 2007/0052241 A1* | 3/2007 | Pacy | .................. | B60H 1/00014 290/40 C |
| 2008/0121195 A1* | 5/2008 | Sobotzik | ................. | F02B 67/08 165/41 |
| 2008/0179130 A1* | 7/2008 | Larson | ................ | F02B 29/0431 180/309 |
| 2009/0071784 A1* | 3/2009 | Combs | .................... | H02M 7/00 290/40 C |
| 2009/0095549 A1* | 4/2009 | Dalum | .................... | B60K 6/48 180/65.265 |
| 2010/0219007 A1* | 9/2010 | Dalum | .................... | B60K 6/48 180/65.21 |
| 2010/0313849 A1* | 12/2010 | Stoner | ................... | B60W 10/02 417/1 |
| 2012/0056474 A1* | 3/2012 | Larson | ....................... | H02J 1/14 307/9.1 |
| 2012/0207620 A1* | 8/2012 | Dalum | .................... | B60L 53/80 903/903 |
| 2014/0225374 A1* | 8/2014 | Collett | ................. | H02K 7/1807 290/40 R |
| 2016/0096412 A1* | 4/2016 | Mankame | .......... | B60H 1/00978 165/203 |
| 2016/0320107 A1* | 11/2016 | McKay | ................ | H02K 7/1846 |
| 2017/0217280 A1* | 8/2017 | Larson | ............... | B60H 1/00764 |
| 2018/0281597 A1* | 10/2018 | Herb | ..................... | B60L 3/0084 |
| 2020/0086744 A1* | 3/2020 | Schumacher | .......... | B60L 58/22 |
| 2020/0172050 A1* | 6/2020 | Schwarz | ................. | B60R 25/33 |

FOREIGN PATENT DOCUMENTS

| | | | | |
|---|---|---|---|---|
| WO | WO-0250938 A1 * | 6/2002 | ................ | H02J 5/00 |
| WO | WO2007011324 A1 | 1/2007 | | |

OTHER PUBLICATIONS

Technology Assessment: Transport Refrigerators from State of California Air Resources Board, 2015. (Year: 2015).*
Machine Translation of Chinese Patent Application CN 202863172 U, Apr. 10, 2013. (Year: 2013).*
Machine Translation of Chinese Patent Application CN 205544468 U, Aug. 31, 2016. (Year: 2016).*
Machine Translation of Chinese Patent Application CN 105680525 A, Jun. 15, 2016. (Year: 2016).*
Machine Translation of Chinese Patent Application CN 103660967 A, Mar. 26, 2014. (Year: 2014).*
Machine Translation of Korean Patent Applications KR 20160116213 A, Oct. 7, 2016. (Year: 2016).*

* cited by examiner

POWER TAKEOFF-DRIVEN REFRIGERATION

CROSS-REFERENCE TO RELATED APPLICATIONS

This application is a continuation-in-part of U.S. Non-Provisional application Ser. No. 17/086,692 filed on Nov. 2, 2020, and further claims the benefit of U.S. Provisional Application Ser. No. 62/951,505, filed on Dec. 20, 2019, both of which are incorporated herein by reference.

TECHNICAL FIELD

The present disclosure relates to semi-trailer refrigeration. More particularly, the present disclosure relates to power takeoff-driven refrigeration to control temperature on a semi-trailer.

BACKGROUND

Freight companies commonly use semi-trailer trucks (more commonly referred to as "semi-trucks" or simply "semis") to transport freight. Often, semi-trucks are used to transport freight under temperature-controlled conditions (e.g., to avoid spoilation). For example, semi-trucks may pull one or more semi-trailers with refrigeration units mounted thereon.

Conventional semi-trailer refrigeration units suffer from numerous drawbacks. For example, conventional semi-trailer refrigeration units are powered by a dedicated diesel engine, necessitating engine maintenance (e.g., coolant monitoring, cleaning, fuel/air filter changing, oil changing, etc.) for an additional diesel engine that is independent of the diesel engine of the semi-truck. Diesel engine maintenance and breakdowns result in semi-trailer refrigeration unit downtime, which increases costs for freight companies.

Furthermore, conventional semi-trailer refrigeration units cause substantial diesel fuel consumption, adding costs and resulting in significant emissions in addition to the emissions already caused by semi-trucks. In addition, conventional semi-trailer refrigeration units require monitoring of additional diesel fuel reservoirs (e.g., the reservoir of the refrigeration unit as well as the reservoir of the semi-truck). When operated independently of a semi-truck (e.g., when operated while not in transit and/or when disconnected from the semi-truck), semi-trailer refrigeration units must still be carefully monitored and/or refueled to preserve freight disposed therein. The excessive maintenance, monitoring, and care required to operate conventional semi-trailer refrigeration units make them prone to user errors that may cause additional breakdowns and/or reduce the lifespan of the units, thereby further increasing costs for freight companies.

Accordingly, there are a number of disadvantages with semi-trailer refrigeration units that can be addressed.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF EXAMPLE EMBODIMENTS

Implements of the present disclosure solve one or more of the foregoing or other problems in the art with semi-trailer refrigeration units. In particular, one or more implementations can include a generator that is configured to be mechanically connected to a power takeoff (PTO) and a converter that is configured to receive AC power from the generator and is operable to convert the AC power to DC power. In some instances, the generator is connected to a charge controller that is connected to an energy storage element (e.g., one or more batteries). The energy storage element is, in some implementations, connected to a controller configured to receive DC power provided by the converter (e.g., through the energy storage element) and provide AC power to a motor. The motor may be mechanically connectable to a refrigeration system.

In some embodiments, the energy storage element is further configured to receive power from a second charge controller that receives power via a 220V AC power input. In some embodiments, the energy storage element may receive power from one or more solar panels coupled to a solar charge controller.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION OF EXAMPLE EMBODIMENTS

Figure 1:
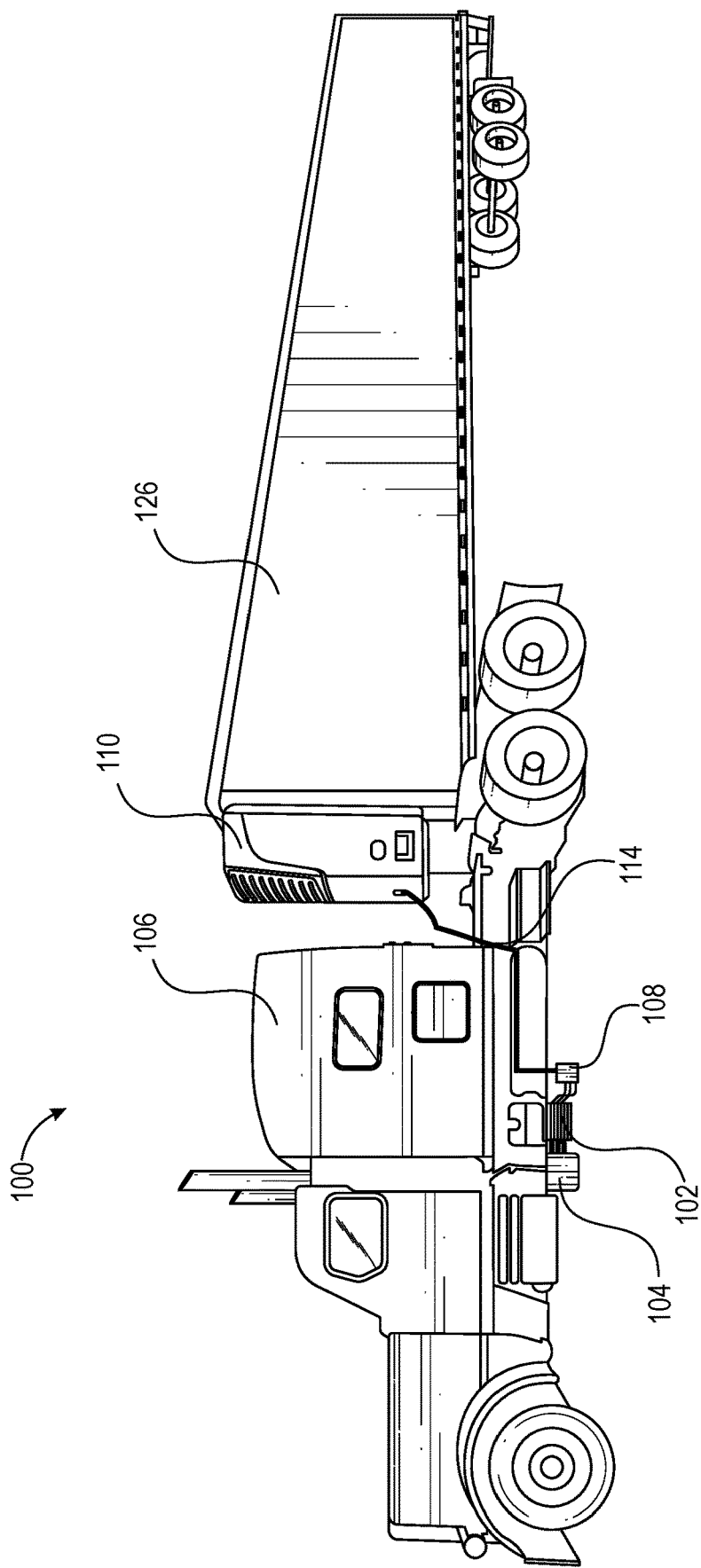
FIG. 1 illustrates a conceptual representation of semi-truck-mounted components of a system for power takeoff (PTO) driven refrigeration.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, any headings used herein are for organizational purposes only, and the terminology used herein is for the purpose of describing the embodiments. Neither are not meant to be used to limit the scope of the description or the claims.

Disclosed embodiments are directed to systems and methods for PTO-driven refrigeration. Some embodiments include a generator that is configured to be mechanically connected to a power takeoff (PTO) and a converter that is configured to receive AC power from the generator and is operable to convert the AC power to DC power. In some instances, the generator is connected to a charge controller that is connected to an energy storage element (e.g., one or more batteries). The energy storage element is, in some implementations, connected to a controller configured to receive DC power provided by the converter (e.g., through the energy storage element) and provide AC power to a motor. The motor may be mechanically connectable to a refrigeration system.

In some embodiments, the energy storage element is further configured to receive power from a second charge controller that receives power via a 220V AC power input. In an alternate embodiment, the energy storage element is configured to receive power from a solar panel coupled to the semi-trailer.

Those skilled in the art will recognize that the disclosed embodiments may address many of the problems associated with semi-trailer refrigeration systems. For instance, disclosed embodiments eliminate the need to use an independent diesel engine to power semi-trailer refrigeration units, thereby avoiding the maintenance, breakdowns, downtime, fuel level monitoring and refilling, and/or emissions associated with using a dedicated diesel engine (e.g., in addition to a diesel engine of a semi-truck). Disclosed embodiments may also avoid problems that typically arise from users failing to exercise due care in maintaining, monitoring, and/or using diesel-powered refrigeration units.

Furthermore, conveniently, at least some disclosed embodiments provide for semi-trailer refrigeration units that may operate independently of a semi-truck by connecting the refrigeration unit to a 220V power input (e.g., when the unit resides in a warehouse). Alternatively, the semi-trailer refrigeration unit may operate independently by connecting the refrigeration unit to a solar panel coupled to the semi-trailer.

In view of the foregoing, the disclosed embodiments may allow freight companies to avoid considerable costs associated with maintaining and operating diesel-driven semi-trailer refrigeration units.

Having just described some of the various benefits and high-level attributes of the disclosed embodiments, additional detail will be provided with reference to FIGS. 1-10, which show various examples, schematics, conceptualizations, and/or supporting illustrations associated with the disclosed embodiments.

FIG. 1 illustrates a conceptual representation of semi-truck-mounted components of a system for power takeoff (PTO) driven refrigeration 100. In particular, as shown in FIG. 1, the system for PTO-driven refrigeration 100 includes a generator 102 that is mechanically connected to a PTO 104. The PTO 104 may be in mechanical communication with the transmission of a semi-truck 106, such that a drive shaft of the PTO 104 is actuated by running the engine of the semi-truck 106. As will be described in more detail hereinafter, the drive shaft of the PTO 104 may be in constant mechanical communication with a PTO driver gear of the transmission of the semi-truck 106 such that the PTO is constantly engaged and rotating whenever the truck runs (e.g., by omitting a shift mechanism).

The generator 102 may be driven by the PTO 104 to generate AC power. It should briefly be noted that the generator 102 may be implemented as an electronic motor that is reversibly operable to receive rotational force to generate AC power or receive AC power to generate rotational force. In some embodiments, the generator 102 is implemented as a three-phase, water-cooled, permanent magnet motor operated as a generator for generating three-phase AC power (e.g., to maintain a high peak voltage). However, other motors/generators may be used. For instance, the generator 102 may be embodied as a brushless DC motor (BLDC motor) operated as a generator.

The generator 102 provides AC power to a converter 108 (e.g., Rectifier/Controller), which converts the AC power into DC power. As suggested by the labeling in FIG. 1, in some implementations, the converter 108 is implemented as a rectifier or another controller/circuit/system suitable for converting AC power into DC power (e.g., motor-generator, rotary converter). As such, the rectifier/controller 108 may provide DC power to other components of the PTO-driven refrigeration system 100. The converter 108 may provide DC power to a refrigeration unit 110 comprising the semi-trailer mounted components of the system for PTO-driven refrigeration 100.

Figure 2:
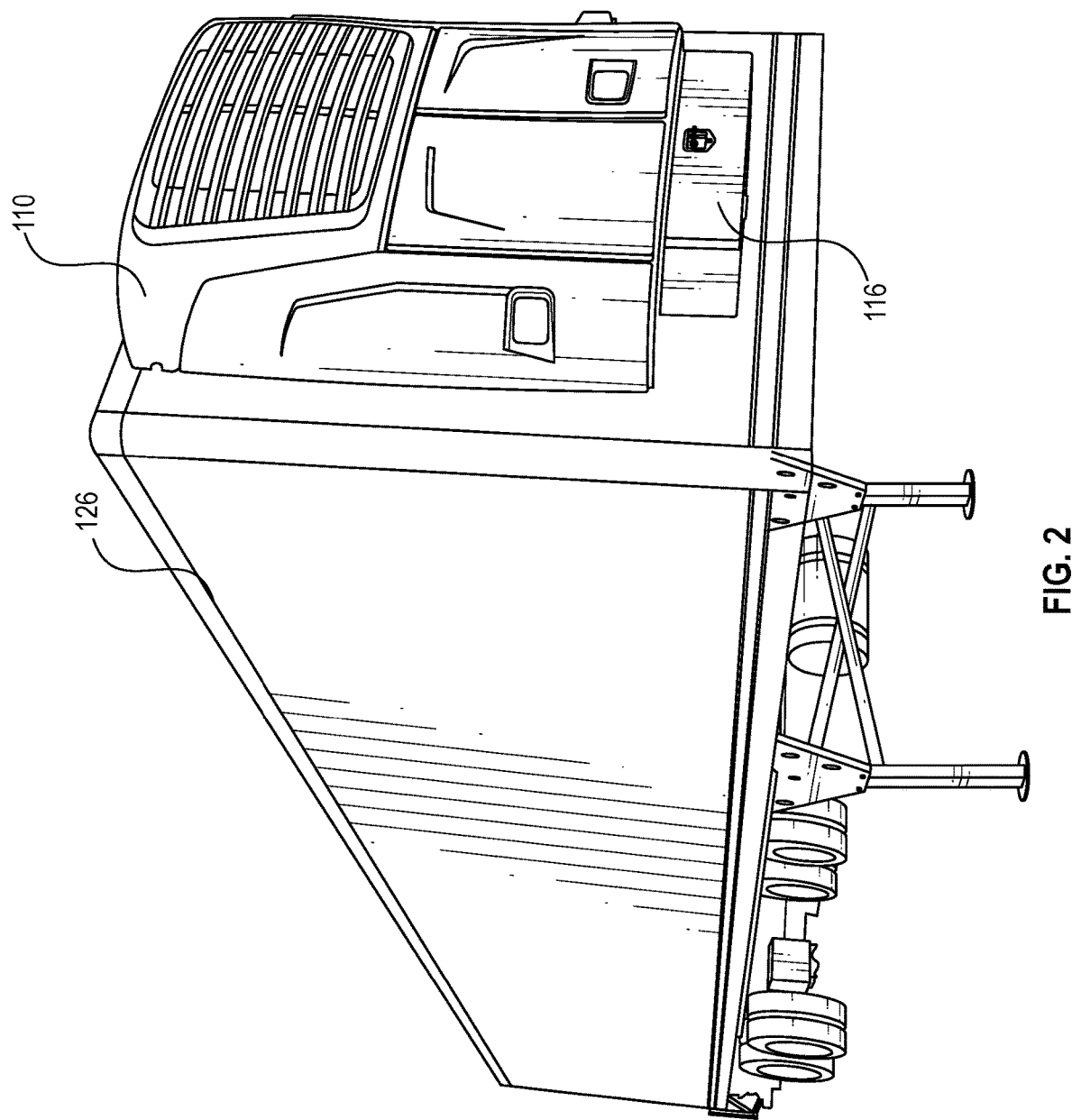
FIG. 2 illustrates a conceptual representation of a semi-trailer and refrigeration unit of a system for PTO-driven refrigeration.
Figure 3:
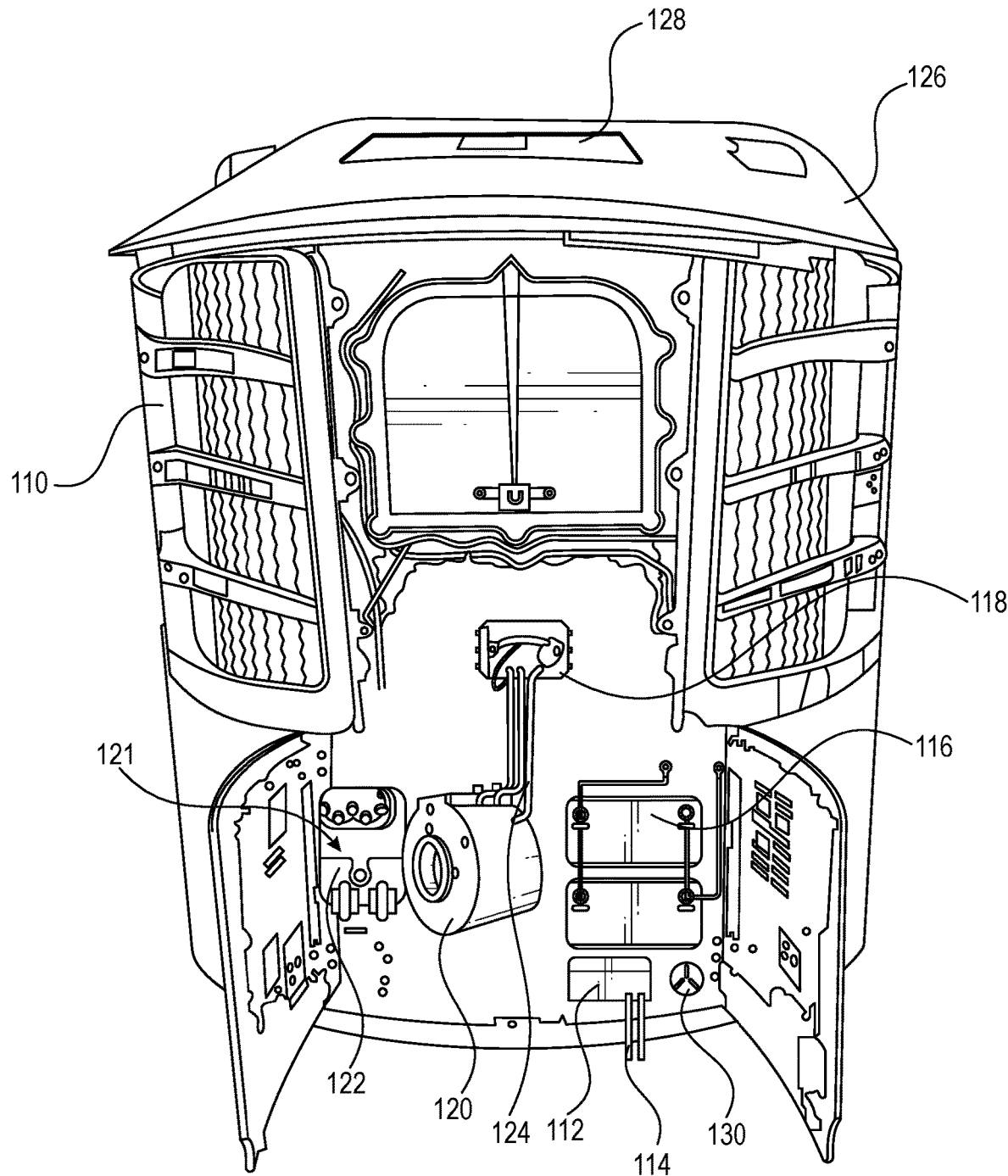
FIG. 3 illustrates a conceptual representation of semi-trailer-mounted components of a system for PTO-driven refrigeration.
Figure 4:
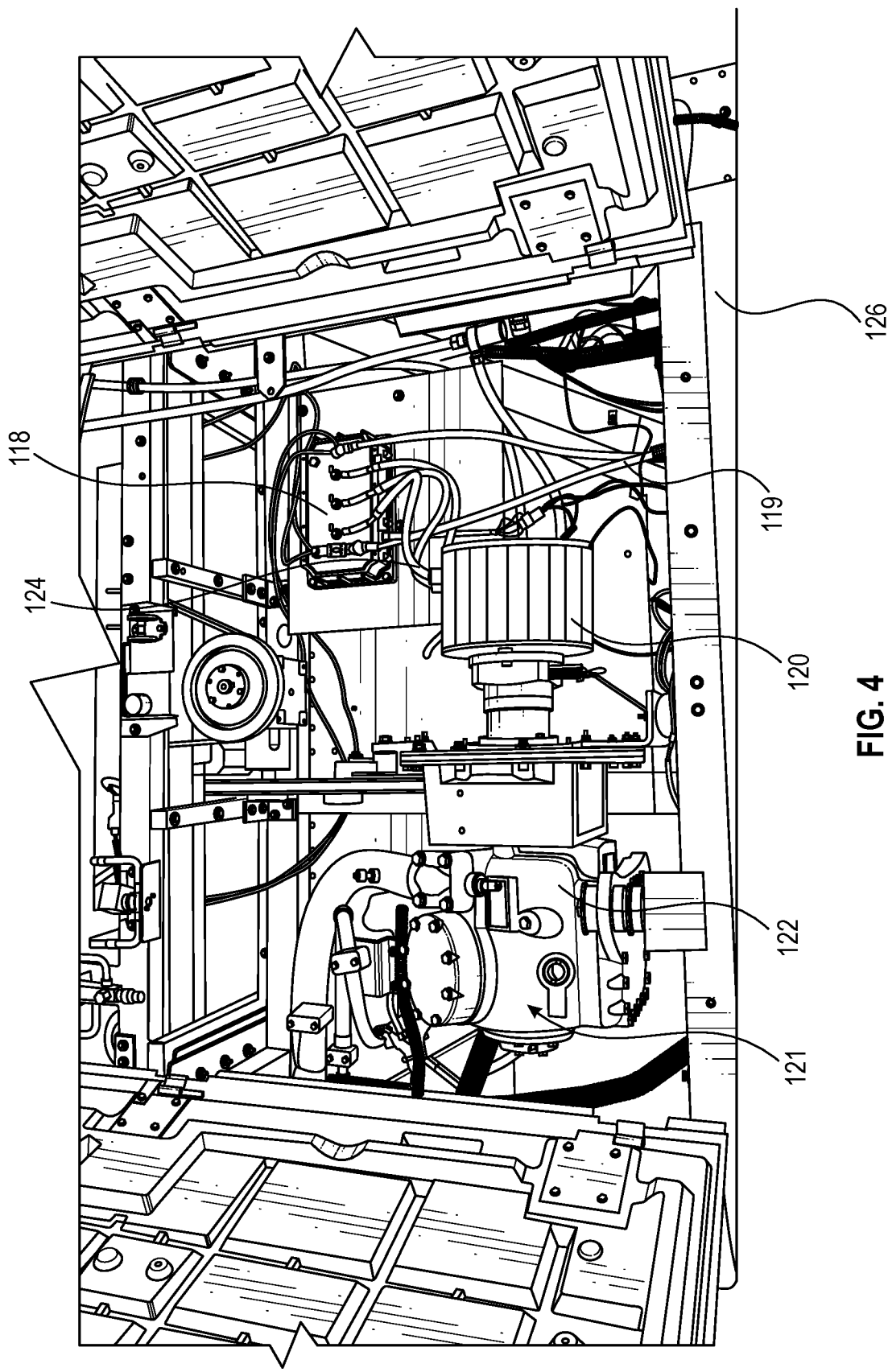
FIG. 4 illustrates a conceptual representation of semi-trailer-mounted components of a system for PTO-driven refrigeration.

FIG. 2-4 illustrate a conceptual representation of semi-trailer-mounted components of the system for PTO-driven refrigeration 100. The rectifier/controller 108 described with reference to FIG. 1 may provide DC power to a charge controller 112, (e.g., a DC regulator) via a wire 114 (shown in FIG. 1 extending toward the semi-trailer). In this manner, in some embodiments, the rectifier/controller 108 provides DC power to an energy storage element, such as a bank of batteries 116 (FIG. 2), through the charge controller 112. Those skilled in the art will recognize that the depiction of a battery bank 116 in FIG. 2 is illustrative only, and non-limiting. For example, the energy storage element 116 may be implemented as one or more lead-acid batteries, nickel-cadmium batteries, nickel-metal hydride batteries, lithium-ion batteries, lithium-ion polymer batteries, flow batteries, capacitors (e.g., supercapacitors, lithium-ion capacitors), and/or even superconducting magnetics.

The rectifier/controller 108 (FIG. 1) may provide DC power to the energy storage element 116 (e.g., battery bank) via a charge controller 112 (e.g., DC regulator). Being charged by the rectifier/controller 108 and DC regulator 112, the battery bank 116 may then provide DC power to a controller 118 via battery wires 119 (FIG. 4). In some embodiments, the controller 118 is configured to invert the received DC power into AC power and provide the AC power to a motor 120. The controller 118 may be implemented as any suitable circuit/system for inverting DC power into AC power (e.g., power inverter, motor-generator, rotary converter).

As mentioned earlier with reference to FIG. 1, the generator 102 may be implemented as an electronic motor that is reversibly operable to receive rotational force to generate AC power or receive AC power to generate rotational force. In this regard, the motor 120 and the generator 102 (shown in FIG. 1) may be identical motors operated in reverse fashion with respect to one another. Specifically, the motor 120 receives AC power from the energy storage element 116 (via the controller 118) and generates rotational force to control a compressor 122, whereas the generator 102 receives rotational force from the PTO 104 and generates AC power.

The motor 120 may be mechanically connected to a refrigeration element/system 121 (e.g., a mechanical-compression refrigeration system). In some implementations, the motor 120 is mechanically connected to a compressor 122 of a refrigeration system such that the motor 120 drives the compressor 122 (e.g., A/C Compressor). It will be appreciated that any type of compressor 122 is within the scope of this disclosure, such as, but not limited to, reciprocating compressors, open drive compressors, scroll compressors, rotary-screw compressors, centrifugal compressors, dual-piston, etc.

Thus, in at least some of the disclosed embodiments, the generator 102 mechanically connected to the rotating PTO 104 generates AC power, which is converted by the converter 108 into DC power and provided to the energy storage element 116 (e.g., to the battery bank via the DC regulator or charge controller 112). The energy storage element 116 then provides stored DC power to the controller 118 that inverts the DC power into AC power. The AC power is sent via controller wires 124 to drive the motor 120 that drives the compressor 122 of the refrigeration unit 110. The compressor 122 may operate within a mechanical-compression refrigeration system/unit to regulate the temperature (e.g., maintain a desired low temperature) within a semi-trailer 126 (or other cavity) to which the refrigeration system/unit 110 is mounted.

In this regard, at least some disclosed embodiments provide a system for PTO-driven refrigeration wherein the refrigeration system on the semi-trailer 126 is powered by the PTO 104 of the semi-truck 106, thereby eliminating the need to power the refrigeration system with an independent diesel engine and eliminating all maintenance, breakdown, monitoring, and/or emissions and fuel consumption problems associated with the use of an independent diesel engine to power the semi-trailer refrigeration unit 110.

Further advantageously, in some implementations, the battery bank 116 (or other energy storage element(s)) is further configured to receive power from a separate charge controller (e.g., separate from the DC regulator). This may allow the refrigeration systems of the present disclosure to be versatilely connectable to different charge sources to be driven thereby, in addition to being chargeable/drivable by the PTO 104. In some instances, the functionality of being chargeable/drivable by different power sources allows the presently disclosed refrigeration systems to be operated when disconnected from a semi-truck or other vehicle (such as when temporarily stored in a warehouse), without requiring diesel fuel monitoring or refilling for the refrigeration systems. For example, referring to FIG. 3, the battery bank 116 (as appreciated from comparing FIGS. 2-3, the location of the battery bank 116 may vary without departing herefrom) may be configured to receive power from a solar panel 128 coupled to the semi-trailer 126. In some embodiments, the solar panel 128 may be non-flexible and may be UV epoxy coated to achieve greater efficiency, although any solar panels may be used. Accordingly, the battery bank 116 may be charged to provide DC power to the controller 118 to drive the motor 120 and the A/C compressor 122 via the solar panels 128 even when the semi-truck 106 is disconnected from the semi-trailer 126.

As represented in FIG. 3, the battery bank 116 may further be configured to receive power from a 220V AC power input 130 (or other AC charge controller). In some embodiments, the 220V AC power input 130 bypasses the DC regulator 112 when a 220V power source is connected to the 220V power input 130. In this manner, the battery bank 116 may be charged via the 220V power input 130 to provide DC power to the controller 118 to drive the motor 120 and the A/C compressor 122 even when the semi-truck 106 is disconnected from the semi-trailer 126 and/or when the rectifier/controller 108 (or other converter described with reference to FIG. 1) is disconnected from the battery bank 116. Those skilled in the art will recognize that providing the functionality of powering a semi-trailer refrigeration system by simply connecting a 220V (or other) power source to the semi-trailer refrigeration battery bank 116 may eliminate significant costs associated with conventional diesel-driven semi-trailer refrigeration systems (e.g., emissions, refueling, fuel monitoring, etc.).

FIGS. 1-4 have shown certain components of the presently disclosed systems for PTO-driven refrigeration 100 as mounted on either the semi-truck 106 or the semi-trailer 126. However, it will be appreciated that the arrangements depicted in FIGS. 1-4 are illustrative only, and non-limiting. For example, the DC regulator 112 (or other charge controller) may be mounted on a semi-truck 105 (or other vehicle) proximate to the rectifier/controller 108 (or other converter), or, alternatively, the rectifier/controller 108 may be mounted on the semi-trailer 126 proximate to the DC regulator 112 and the battery bank 116 (or other energy storage element). Further, the battery bank 116 may be mounted on the semi-trailer 126 below the refrigeration unit 110 (FIG. 2), mounted within the refrigeration unit 110 (FIG. 3), or mounted in other locations on the semi-trailer 126.

Additionally, it will be appreciated that FIGS. 1-4 show conceptual representations of the components of the presently disclosed systems for PTO-driven refrigeration 100, and, therefore, any depicted positioning/placement of components on the semi-trailer 126 or semi-truck 106 are illustrative only and non-limiting. For instance, although FIG. 1 shows a rectifier/controller 108 mounted underneath the semi-truck 106 proximate to the generator 102, it will be recognized that the rectifier/controller 108 may be mounted on the catwalk of the semi-truck 106, within the cab thereof, or even on the semi-trailer 126 as mentioned above.

It should also be noted that the presently disclosed systems for PTO-driven refrigeration 100 may include components not explicitly shown in FIGS. 1-4. For example, as will be described in more detail hereinafter, the system for PTO-driven refrigeration 100 may include or be in communication with one or more computing systems and/or sensors to facilitate the operation and/or monitoring of the system and/or components thereof. In another example, the system for PTO-driven refrigeration 100 may include one or more cooling systems for cooling the generator 102 and/or the motor 120, such a semi-truck-mounted radiator and fan system in fluid communication with the generator 102 and a semi-trailer-mounted radiator and fan system in fluid communication with the motor 120 that drives the A/C compressor 122.

Those skilled in the art will recognize that certain aspects and/or components of the system for PTO-driven refrigeration 100 shown and described with reference to FIGS. 1-4 may be omitted and/or replaced in some implementations. For instance, in some embodiments, the battery bank 116 and/or charge controller 112 is omitted from the system such that the rectifier/controller 108 converts the AC power received from the generator 102 into DC power and is directly coupled to the controller 118 that receives the DC power and inverts it into AC power to provide to the A/C compressor 122. In some embodiments, the rectifier/controller 108 may be directly coupled to the generator 102.

As briefly noted hereinabove, the drive shaft of the PTO 104 may be in constant mechanical communication with a PTO driver gear of the transmission to which the PTO 104 is attached/affixed (e.g., the transmission of a semi-truck). For example, in some embodiments, the PTO 104 may be constantly engaged by using an electric disconnect (e.g., a solenoid) and a wet clutch (or other suitable clutch system). In one embodiment, the solenoid may be internal to the wet clutch. By using an electronically controlled clutch (e.g., the solenoid), the PTO 104 can be engaged/disengaged electronically via user input or when a set of parameters has been met (e.g., insufficient power remaining in batteries, insufficient sun for solar, etc.). In such a scenario, the solenoid engages the wet clutch to generate power from the PTO to the generator 102. According to at least some of the presently disclosed embodiments, the PTO 104 is not utilized to mechanically drive a hydraulic pump (e.g., in a conventional wet kit for use with tanker trucks) but rather to drive the generator 102 to generate AC power for conversion into DC power to provide to the charge controller 112 with electricity to charge the battery bank 116. As such, running the PTO 104 at a high rate does not carry the risk of causing mechanical damage to a hydraulic pump, components thereof, or any other mechanical elements. Therefore, advantageously, the PTO 104 may be constantly engaged without risking damage to the components driven thereby, according to the present embodiments.

Figure 5:
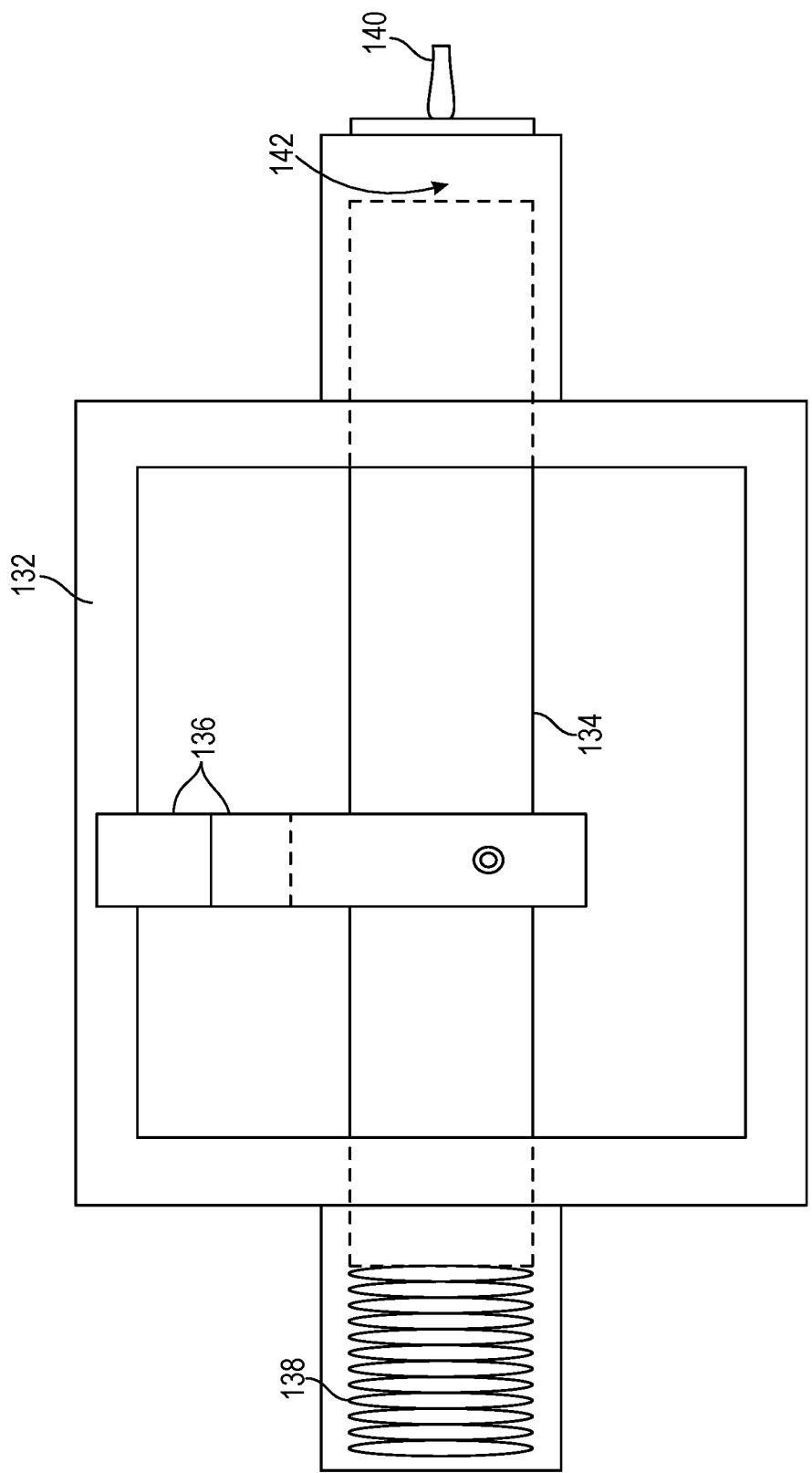
FIG. 5 illustrates a schematic representation of a PTO air shift assembly in a disengaged configuration.
Figure 6:
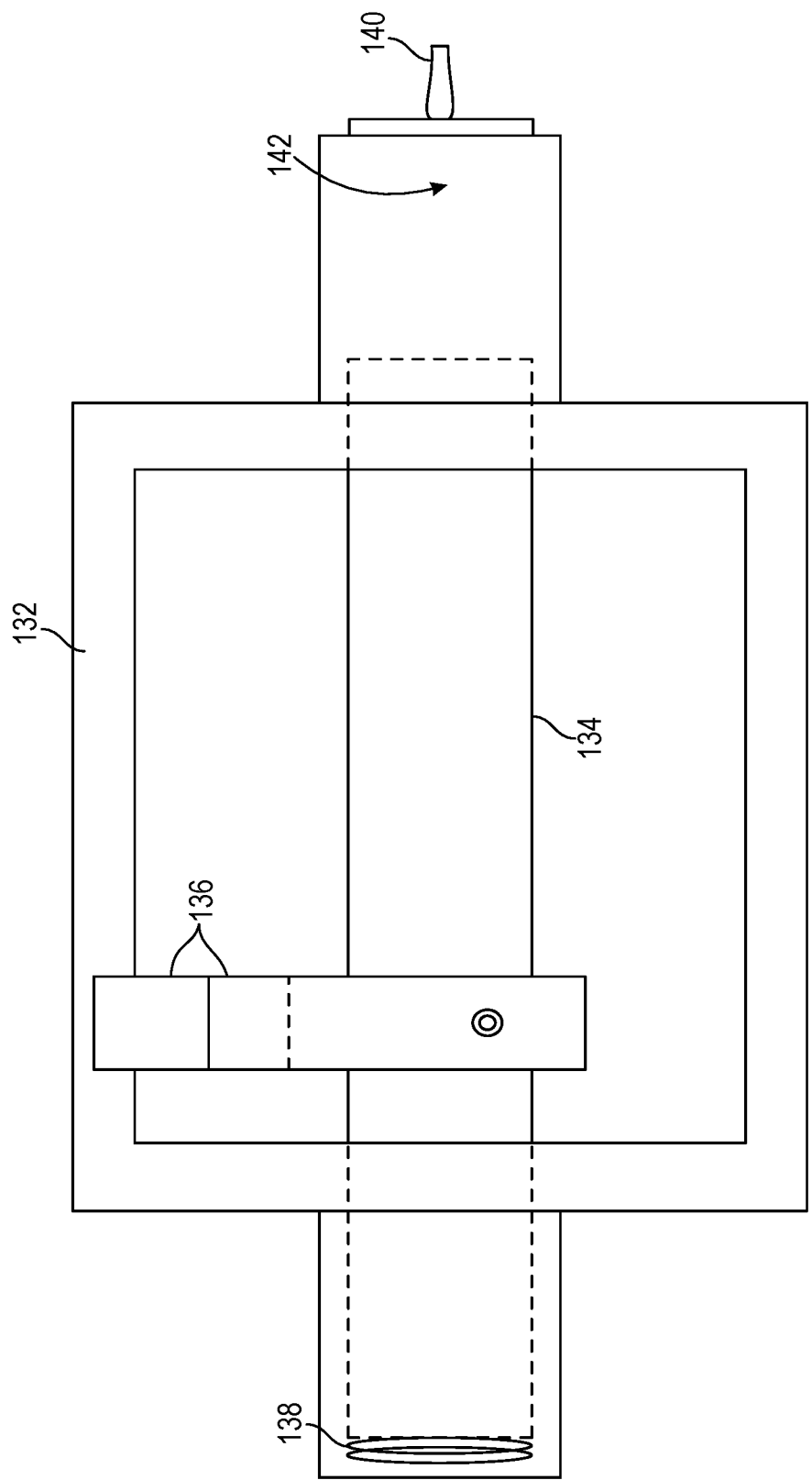
FIG. 6 illustrates a schematic representation of a PTO air shift assembly in an engaged configuration.

FIG. 5 illustrates a schematic representation of a PTO air (or other fluid) shift assembly 132 in a disengaged configuration, while FIG. 6 illustrates the air shift assembly 132 in an engaged configuration. As shown, the air shift assembly 132 includes a shifter shaft 134 connected to a shifter fork 136. The shifter fork 136 is sized to fit around a sliding gear (not shown) of the PTO 104 such that the sliding gear of the PTO 104 will translate along with the shifter fork 136 between a disengaged position (as represented in FIG. 5) and an engaged position (as represented in FIG. 6, wherein the sliding gear becomes mechanically driven by a driver gear of a transmission).

As shown in FIGS. 5 and 6, the air shift assembly 132 includes a return spring 138 and an air valve 140 connected to an air chamber 142. In some instances, a switch (e.g., located within the cab of a semi-truck) triggers the opening of the air valve 140 to fill the air chamber 142, pushing the shifter shaft 134 (e.g., via a piston) against the return spring 138 (compressing the return spring) and translating the shifter fork 136 into the engaged position (as illustrated in FIG. 6). The process may be reversed (e.g., in response to disengaging the switch) to open the air valve 140 to release the air from the air chamber 142 and allow the return spring 138 to push the shifter shaft 134 and shifter fork 136 into the disengaged position (illustrated in FIG. 5).

Those skilled in the art will recognize that the principles disclosed herein may be practiced utilizing the PTO 104 that utilizes any type of shift assembly (e.g., hydraulic shift, wire shift, other mechanical linkage, clutch shift, etc.), recognizing that the PTO 104 must be engaged to power the generator 102 to ultimately drive the system for PTO-driven refrigeration 100. However, as noted above, a system for PTO-driven refrigeration may operate with a PTO that omits a shift mechanism for shifting between engaged and disengaged positions. Such PTOs may be specially or specifically manufactured without a shift mechanism and with gears positioned and sized such that the drive shaft of the PTO is in constant mechanical communication with the PTO driver gear of the transmission when the PTO is mounted to the transmission. In other instances, an existing PTO shift mechanism may be modified to lock the shift mechanism into an engaged position.

Figure 7:
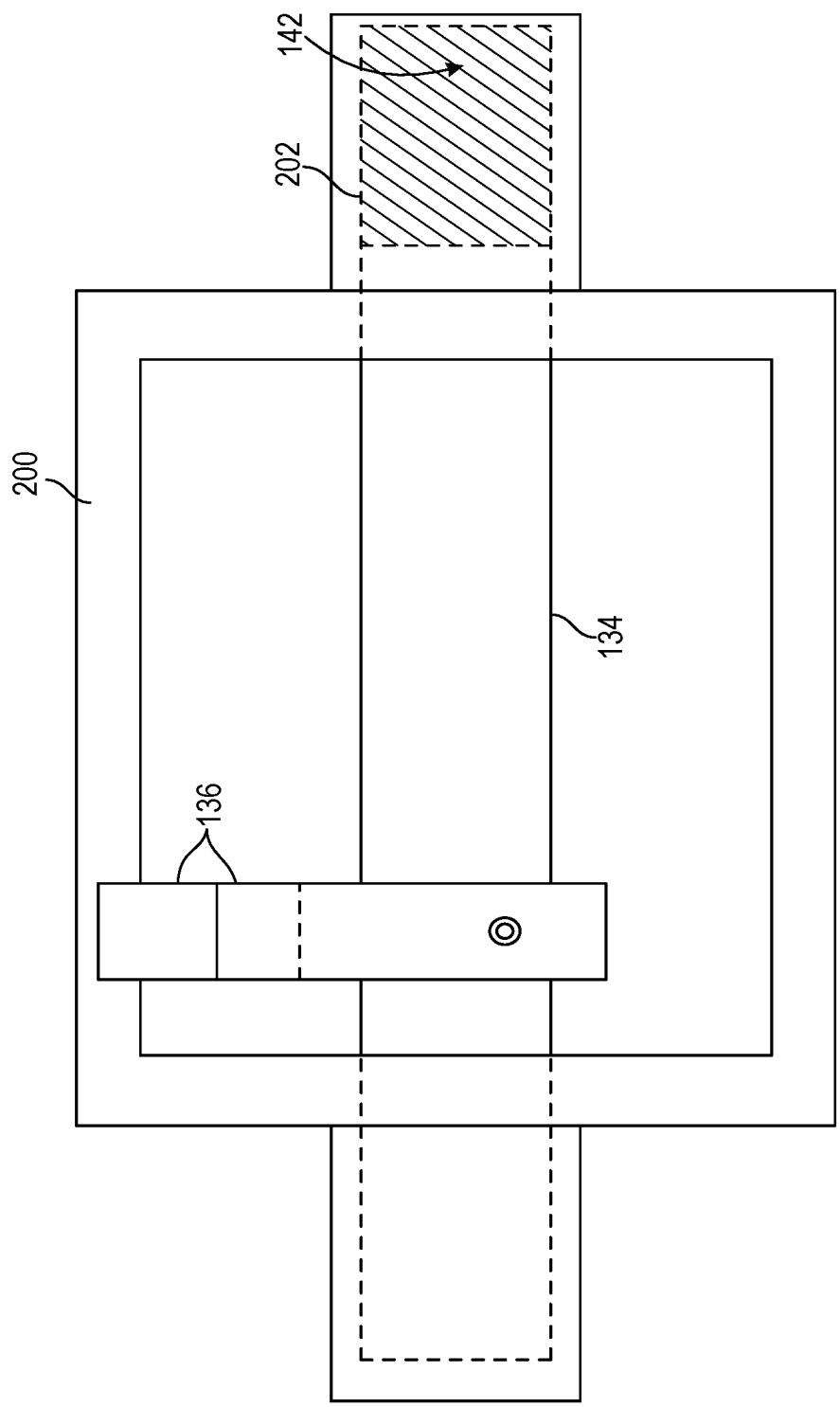
FIG. 7 illustrates a schematic representation of a PTO air shift assembly modified to be locked into an engaged configuration

FIG. 7 illustrates an example of a shift assembly 200 that has been modified to be locked into an engaged configuration. As shown, the shift assembly 200 omits the air valve 140 or intake channel, and the shift assembly 200 includes a lock 202 (e.g., block, pin, solid member, etc.) inserted and secured within the air chamber 142 keeping the shifter shaft 134 and the shifter fork 136 into the engaged configuration. As shown, the air shift assembly 200 also omits a return spring. Accordingly, as modified in the manner shown in FIG. 7, when the air shift assembly 200 is affixed to the PTO 104, the shift assembly 200 is locked in an engaged configuration, causing a sliding gear to which the shifter fork 136 is connected to persist in an engaged state and causing a drive shaft of the PTO 104 to be in constant mechanical communication with a PTO driver gear of a transmission when the PTO 104 is mounted to the transmission. This may allow the semi-trailer system for PTO-driven refrigeration 100 to run whenever the semi-trailer 126 is connected to the semi-truck 106 (or other ground transportation vehicle) with a constantly engaged PTO (e.g., as shown and/or described with reference to FIG. 7), thereby eliminating the possibility of inadvertently disengaging the PTO 104 while operating the semi-truck 106 and causing the temperature within the semi-trailer 126 to reach unacceptable levels.

Although FIG. 7 focuses on modifications that one could make to an air shift assembly to lock a sliding gear into an engaged position, those skilled in the art will recognize that any modifications to a PTO shift assembly (e.g., a wire shift, clutch shift, mechanical linkage, or other shift assembly) that cause a sliding gear or collar of the PTO to persist in an engaged configuration are within the scope of this disclosure. For example, in place of air or a block, a PTO shift assembly may utilize a solenoid switch, engaging and disengaging the generator from the PTO via an electric switch within the cab of the truck or using controllers or a computing system (described later herein) using predetermined parameters (e.g., temperature, battery status, solar status, etc.).

As mentioned, the systems for PTO-driven refrigeration 100 disclosed herein provide DC power at various points, such as from the rectifier/controller 108 (or another converter) that converts AC power received from the generator 102 into DC power, or from the battery bank 116 (or other energy storage element). Accordingly, as previously noted, the presently disclosed systems for PTO-driven refrigeration 100 may provide power to one or more computing systems (e.g., electronic control modules (ECMs)) that are implemented as part of the systems for PTO-driven refrigeration 100 or are in communication with the same. For example, the one or more computing systems may receive DC power from the converter 108 (e.g., rectifier/controller) directly or the battery bank 116. The computing system(s) may provide input, monitoring, communication, sensing, notification, and/or safety functionalities that may protect the system components and/or increase control by administrators (e.g., fleet commanders, freight companies). In some instances, one or more computing systems are implemented into the rectifier/controller 108 that converts the AC power from the generator 102 into DC power and/or into the controller 118 that receives DC power from the battery bank 116. As will be described in more detail hereinafter, the one or more computing systems may be in communication with one another and/or with outside computing systems, devices, or components.

Figure 8:
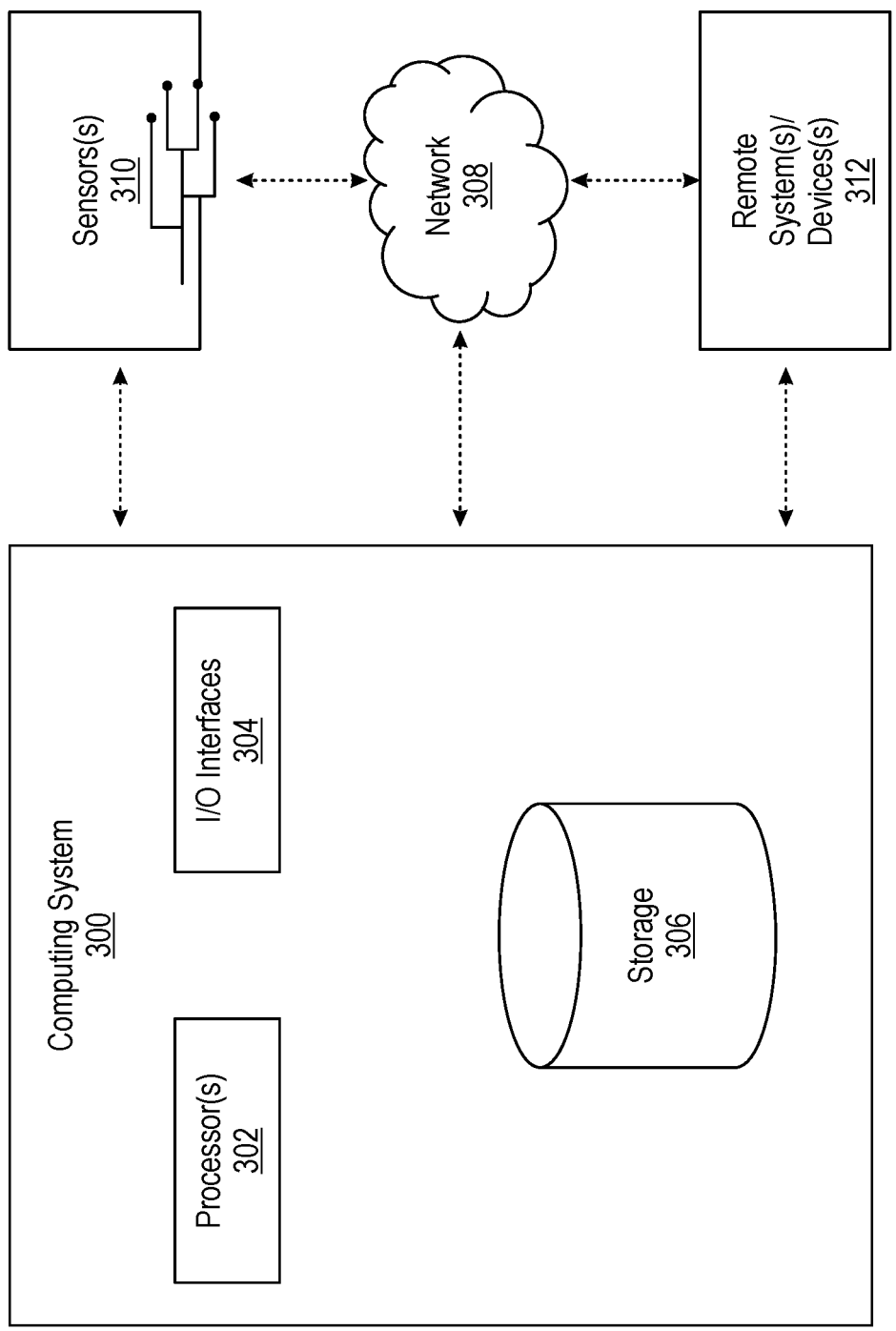
FIG. 8 illustrates a schematic representation of a computing system.

FIG. 8 illustrates a schematic representation of a computing system 300. The computing system 300 may take various forms, such as electronic control modules (ECMs) personal computers, desktop computers, laptop computers, tablets, handheld devices (e.g., mobile phones, PDAs, pagers), microprocessor-based or programmable consumer electronics, minicomputers, mainframe computers, multi-processor systems, network PCs, distributed computing systems, datacenters, message centers, routers, switches, and even devices that conventionally have not been considered a computing system, such as wearables (e.g., glasses, head-mounted displays).

As noted, the computing system 300 may also be a distributed system that includes one or more connected computing components/devices that are in communication. Accordingly, the computing system 300 may be embodied in any form and is not limited to any particular embodiment explicitly shown herein.

In its most basic configuration, the computing system 300 includes various components. For example, FIG. 8 shows that computing system 300 includes at least one hardware processing unit 302 (a "processor"), input/output (I/O) interfaces 304, and storage 306.

The storage 306 may be physical system memory, which may be volatile, non-volatile, or some combination of the two. The term "memory" may also be used herein to refer to non-volatile mass storage such as physical storage media. If the computing system 300 is distributed, the processing, memory, and/or storage capability may be distributed as well. As used herein, the term "executable module," "executable component," or even "component" can refer to software objects, routines, or methods that may be executed on the computing system 300. The different components, modules, engines, and services described herein may be implemented as objects or processors that execute on the computing system 300 (e.g., as separate threads).

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The disclosed embodiments may comprise or utilize a special-purpose or general-purpose computer including computer hardware, such as, for example, one or more processors (such as the hardware processing unit 302, which may include one or more central processing units (CPUs), graphics processing units (GPUs) or other processing units) and system memory (such as storage 306). Such components may also be combined into a single unit (e.g., microcontroller). Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

A "network," like the network 308 shown in FIG. 8, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computing system 300 will include one or more communication channels that are used to communicate with the network 308. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

While not all computing systems require a user interface, in some embodiments, a computing system 300 includes, as part of the I/O interfaces 304, a user interface for use in communicating information to/from a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, controllers, projections, holograms, cameras, keyboards, stylus, mouse, or other pointer input, sensors of any type, and so forth. The computing system 300 may perform certain functions in response to detecting certain user input.

The computing system 300 may also be connected (via a wired or wireless connection) to external sensors 310 (e.g., a temperature sensor associated with the generator, motor, or refrigeration unit, or internal temperature of the trailer, an RPM sensor, a pressure sensor, battery sensors, or other sensors). It will be appreciated that the external sensors 310 may regulate the temperature of the semi-trailer 126. For example, the external sensors 310 may communicate with the computing system 300, when the temperature exceeds a predetermined threshold, to start the motor 120 and the compressor 122. Additionally, the external sensors 310 may communicate with the computing system 300 to determine the state of charge of the battery bank 116. For example, if the battery bank has a low state of charge, the external sensors 310 may communicate with the computing system 300. The computing system 300 may then communicate with the systems for PTO-driven refrigeration 100 to retrieve power from the PTO 104, 220V power input, or the solar panel 128. It will be appreciated that the external sensors may include sensor systems known in the art rather than solely individual sensor apparatuses.

Further, the computing system 300 may also include communication channels allowing the computing system 300 to be in wireless (e.g., Bluetooth, Wi-Fi, satellite, infrared, etc.) or wired communication with any number or combination of sensors 310, networks 308, and/or other remote systems/devices 312. Remote systems/devices 312 may be configured to perform any of the processing described with regard to computing system 300. By way of example, a remote system may include an administrative system that receives sensor readings from the sensors 310.

Those skilled in the art will appreciate that the embodiments may be practiced in network computing environments with many types of computer system configurations. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Additionally, or alternatively, the functionality described herein can be performed, at least in part, by one or more hardware logic components (e.g., the hardware processing unit 302). For example, and without limitation, illustrative types of hardware logic components that can be used include Field-Programmable Gate Arrays (FPGAs), Application- Specific or Application-Specific Integrated Circuits (ASICs), Application-Specific Standard Products (ASSPs), System-On-A-Chip Systems (SOCs), Complex Programmable Logic Devices (CPLDs), Central Processing Units (CPUs), and other types of programmable hardware.

Having described exemplary components and configurations of a computing system 300, the following describes various functionalities that may be facilitated by the computing system 300 or a remote system/device 312 of a system for PTO-driven refrigeration of the present disclosure.

In some embodiments, the computing system 300 includes computer-executable instructions (e.g., stored on storage 306) that enable the computing system 300 (e.g., by one or more processors 302 executing the computer-executable instructions) to selectively activate or deactivate any portion of the system for PTO-driven refrigeration 100, such as the generator 102, the motor 120, the compressor 122, etc.

In some instances, the computing system 300 selectively activates or deactivates one or more components of the system for PTO-driven refrigeration 100 in response to a triggering event, such as receiving user input (e.g., locally or from an administrative computing system) or detecting a sensor reading that meets or exceeds a predetermined threshold or is outside of a predefined acceptable range. In implementations where the computing system 300 includes or is in communication with a user interface (e.g., whether directly as an I/O interface 304 or as part of a remote system/device 312, such as a mobile device of a semi-truck driver or fleet administrator), the computing system 300 may receive triggering input (e.g., from an I/O interface 310 or a remote system/device 312) that causes the computing system 300 to selectively activate or deactivate one or more components of the system for PTO-driven refrigeration 100 (e.g., the motor 120, the generator 102, the A/C compressor 122).

Furthermore, a computing system 300 may cause sensor values detected by the various sensors 310 in communication with the computing system 300 to be displayed on a user display or user interface (e.g., an I/O interface 304 and/or a display of a remote system/device 312). For example, the computing system 300 may cause display of representations of sensor readings associated with detected state of charge, DC draw amperage, and/or amp hours associated with the battery bank, load amps of the motor, temperature of the motor, generator, and/or refrigerated semi-trailer (or other cavity), etc. Displaying combinations of sensor readings to a user/administrator may enable a user/administrator to ensure that the system for PTO-driven refrigeration 100 is operated with due care, so as to avoid damage to the system or other damages caused by improper operation thereof.

In some instances, the computing system 300 is configured to provide a notification on a user/administrator interface in response to detecting that a sensor reading of one or more sensors of the system for PTO-driven refrigeration 100 has met or exceeded a predetermined threshold value (e.g., an unacceptably high temperature of the motor 120, generator 102, and/or refrigerated area). The notification can take on various forms, such as a visual notification on a screen, a sound, etc.

It should be noted that a user or an administrator may define threshold values that may trigger the display of a notification (or even trigger selective deactivation of one or more system components). For instance, the administrator or user may define a maximum operational temperature for the generator 102 or motor 120, a minimum state of charge for the battery bank 116, a maximum draw from the battery bank 116, and/or a maximum starting load for the motor 120. In this way, freight company administrators and/or fleet commanders may ensure optimal operation of systems for PTO-driven refrigeration 100 to extend the economic life of such systems.

Figure 9:
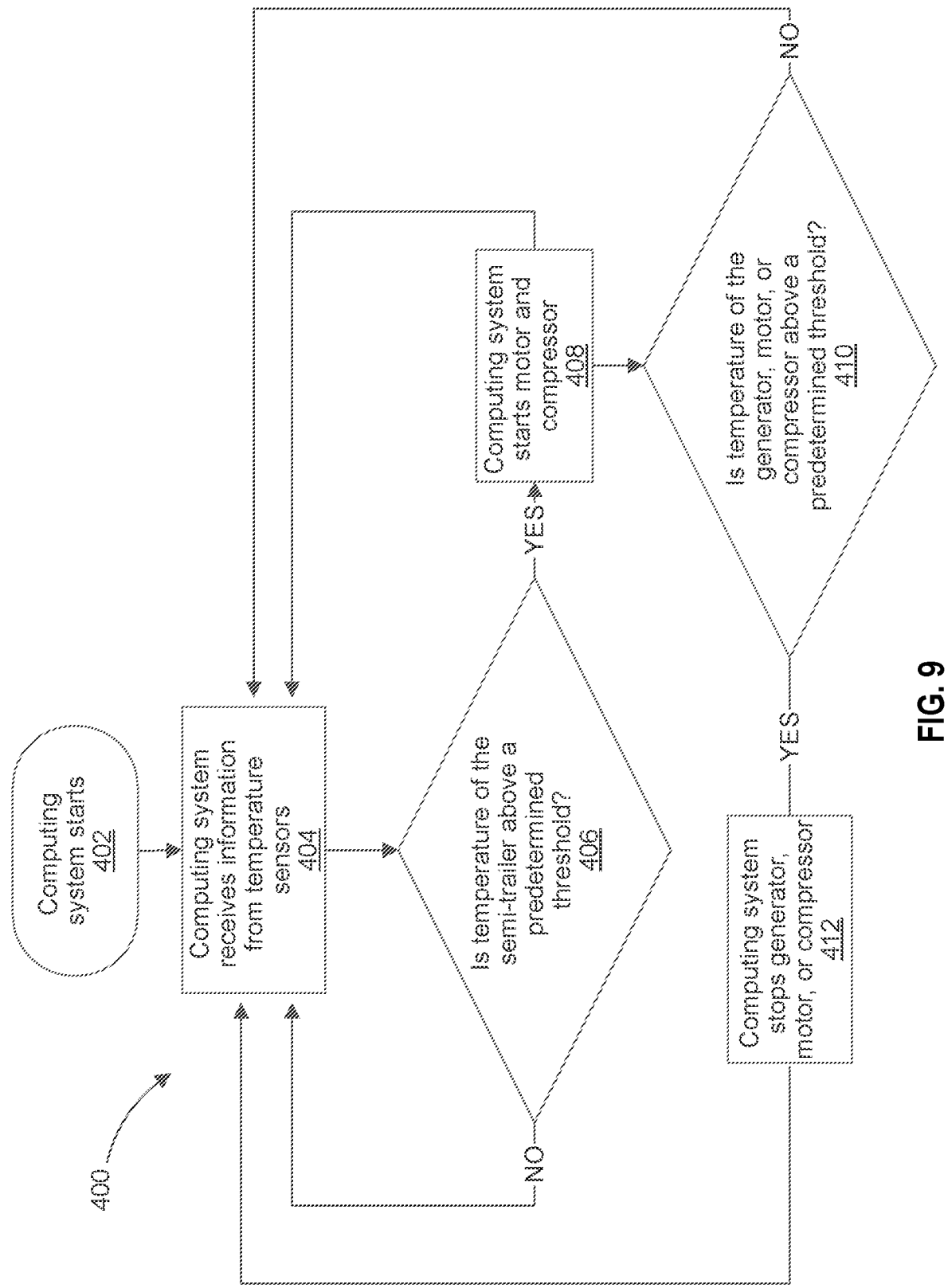
FIG. 9 illustrates a flowchart of temperature regulation of a system for PTO-driven refrigeration.
Figure 10:
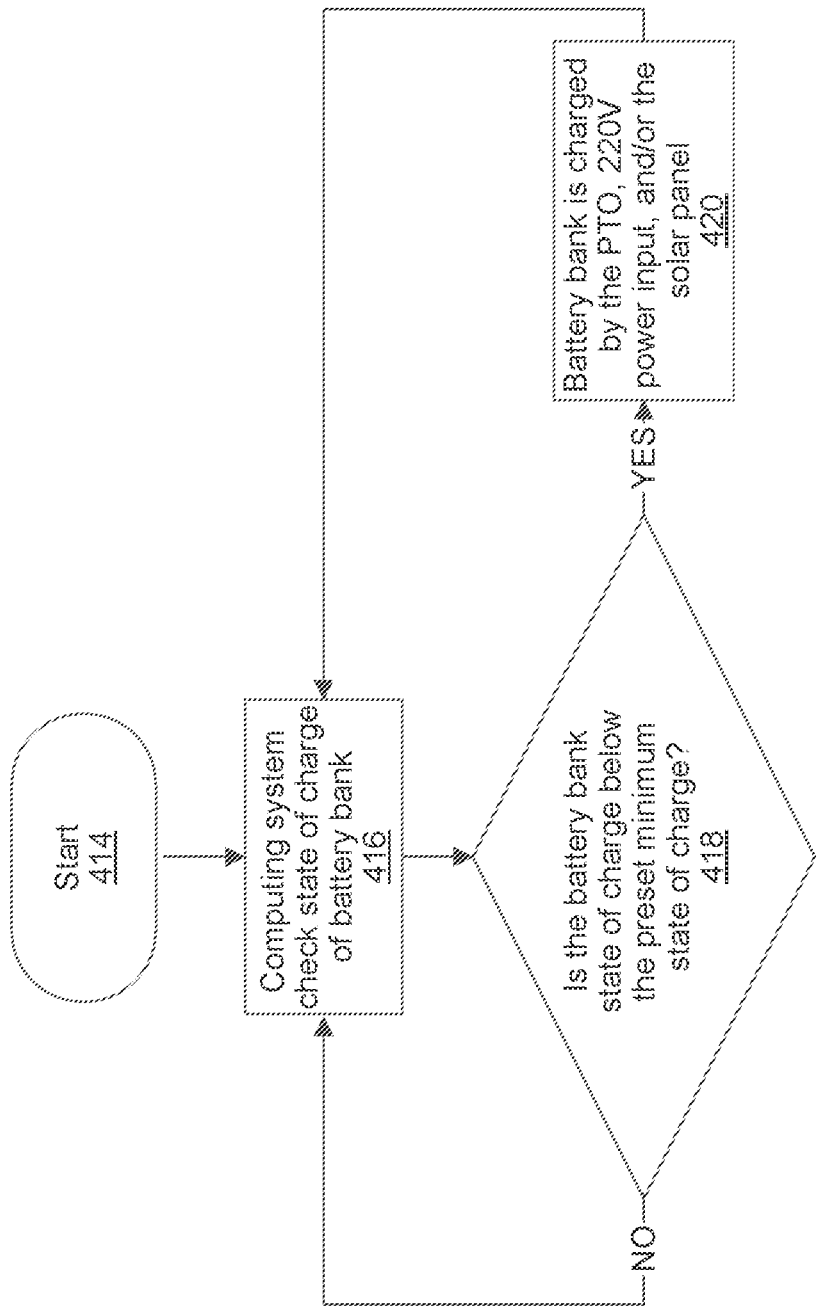
FIG. 10 illustrates a flowchart of battery regulation of a system for PTO-driven refrigeration.

FIGS. 9 and 10 illustrate example flow charts of a computing system 400 used for monitoring temperature and battery state of charge. As shown in FIG. 9, at step 402, the computing system starts. Then the computing system receives information from temperature sensors at step 404. After the information is received, at step 406, the temperature is analyzed to determine if it is above a predetermined threshold. If it is not above the threshold, then the system returns to step 404. If the temperature for the semi-trailer is above a predetermined threshold, then at step 408 the computing system starts the motor and compressor to cool the semi-trailer. The system may then return to step 404 while also proceeding to step 410. At step 410, the system checks whether the temperature of the generator, motor, or compressor is above a predetermined threshold. If the temperature is not above the threshold, the system returns to step 404. If the temperature is above the threshold at 410, then at step 412 the computing system stops the generator, motor, or compressor to prevent damage to those components. The system then returns to step 404. Additionally, using the computing system and network hereinabove described, a notification may be sent to a user at any step in the flow. For example, if a component is stopped in 412, a notification may be sent to a user, allowing them to take appropriate measures to ensure that the cargo in the trailer is not spoiled as a result of increasing temperatures due to mechanical failures.

Referring to FIG. 10, at step 414, the system starts. The computing system then checks the state of charge of the battery bank at step 416. Once the state of charge is checked, at step 418, the system determines whether the battery bank state of charge is below the preset minimum state of charge. If it is not below the preset minimum, then the system returns to step 416. If it is below the preset minimum charge, then at step 420 the battery bank is charged by the PTO, 220V power input, and/or the solar panel 420.

Additionally, although the foregoing disclosure has focused on semi-truck/semi-trailer refrigeration unit implementations, those skilled in the art will recognize that the principles described may be applied to any ground transportation vehicles/trailers, and even to subject areas that do not include refrigeration. For example, a system may include a PTO-driven generator that provides AC power to a converter that converts the received AC power into DC power and provides the DC power to an inverter that inverts the DC power back into AC power and provides the AC power to a motor that drives/operates a dump truck/trailer, aerial lift, pump, vacuum, plow, excavator, or other device.

Unless defined otherwise, all technical and scientific terms used herein have the same meaning as commonly understood by one of ordinary skill in the art to which the present disclosure pertains.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

While the forgoing examples are illustrative of the principles of the present invention in one or more particular applications, it will be apparent to those of ordinary skill in the art that numerous modifications in form, usage, and details of implementation can be made without the exercise of inventive faculty, and without departing from the principles and concepts of the invention.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A system for power takeoff-driven refrigeration, comprising:
    a generator mechanically coupled to a power takeoff (PTO), wherein a drive shaft of the PTO is in constant mechanical communication with a PTO driver gear of a transmission of a semi-truck when the PTO is mounted to the transmission of the semi-truck;
    a converter configured to receive Alternating Current (AC) power from the generator, the converter being operable to convert the AC power to Direct Current (DC) power, the converter configured to send a first portion of the DC power to a DC regulator and a second portion of the DC power to a computing system that has one or more processors and one or more computer-readable hardware storage media;
    the DC regulator configured to receive the DC power from the converter and configured to charge a battery bank;
    an AC charge controller configured to receive 220V AC power, wherein the AC charge controller is configured to charge the battery bank;
    an inverter coupled to the battery bank configured to invert DC power to AC power, the inverter configured to provide AC power to a motor;
    the motor mechanically coupled to a compressor of a refrigeration system of a semi-trailer; and
    a first cooling system in fluid communication with the generator and mountable on the semi-truck, and a second cooling system in fluid communication with the motor and mountable on the semi-trailer;
    wherein the computing system is configured to communicate with one or more sensors associated with the generator, the motor, or the refrigeration system; and
    wherein the computer-readable hardware storage media comprises computer-executable instructions being executable by the one or more processors to cause the computing system to selectively activate or deactivate the motor or the generator in response to a triggering event.

2. The system of claim 1, wherein the generator is configured to generate three-phase AC power.

3. The system of claim 1, wherein the computer-readable hardware storage media comprises computer-executable instructions being executable by the one or more processors to cause the computing system to provide a notification on a user interface associated with the computing system in response to detecting that a sensor reading of the one or more sensors has met or exceeded a predetermined threshold value.

4. The system of claim 1, wherein the computing system is configured to wirelessly communicate with one or more administrative computing systems.

5. The system of claim 4, wherein the computer-readable hardware storage media comprises computer-executable instructions being executable by the one or more processors to cause the computing system to provide a notification on the one or more administrative computing systems in response to detecting that a sensor reading of one or more sensors has met or exceeded a predetermined threshold value.

6. The system of claim 1, wherein the triggering event is receiving user input from a user interface.

7. The system of claim 1, wherein the triggering event is receiving input from an administrative computing system that is in communication with the computing system.

8. The system of claim 1, wherein the triggering event is detecting that a sensor reading of one or more sensors of the system has met or exceeded a predetermined threshold value.

* * * * *